(No Model.)

H. H. BLADES.
MEANS FOR SUPPORTING STORAGE BATTERIES ON RAILWAY CARS.

No. 435,640. Patented Sept. 2, 1890.

WITNESSES
C. J. Shipley
Marion A. Reeve

INVENTOR
Harry H. Blades
By Wells W. Leggett &co
Attorneys.

UNITED STATES PATENT OFFICE.

HARRY H. BLADES, OF DETROIT, MICHIGAN.

MEANS FOR SUPPORTING STORAGE-BATTERIES ON RAILWAY-CARS.

SPECIFICATION forming part of Letters Patent No. 435,640, dated September 2, 1890.

Application filed January 10, 1890. Serial No. 336,469. (No model.)

*To all whom it may concern:*

Be it known that I, HARRY H. BLADES, a citizen of the United States, residing at Detroit, county of Wayne, State of Michigan, have invented a certain new and useful Improvement in Means for Supporting Storage-Batteries on Railway-Cars; and I declare the following to be a full, clear, and exact description of the invention, such as will enable others skilled in the art to which it pertains to make and use the same, reference being had to the accompanying drawings, which form a part of this specification.

It is the object of my invention to provide a means for supporting secondary batteries from the body of a car in such a way as to obviate the necessity of altering the car-body or of employing a special truck adapted to support the batteries.

It consists in a combination of devices and appliances hereinafter described and claimed.

Figure 1:
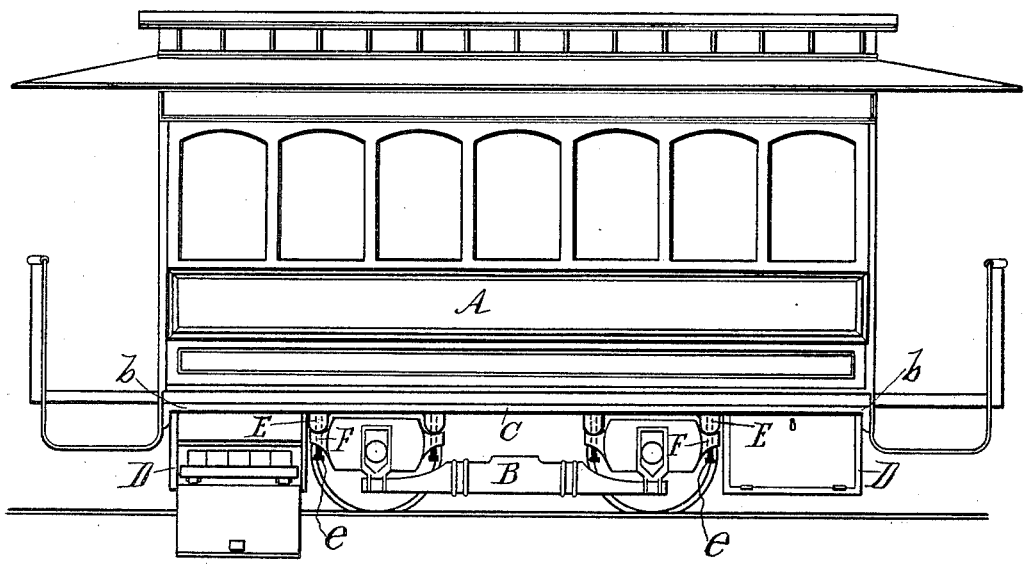
Figure 2:
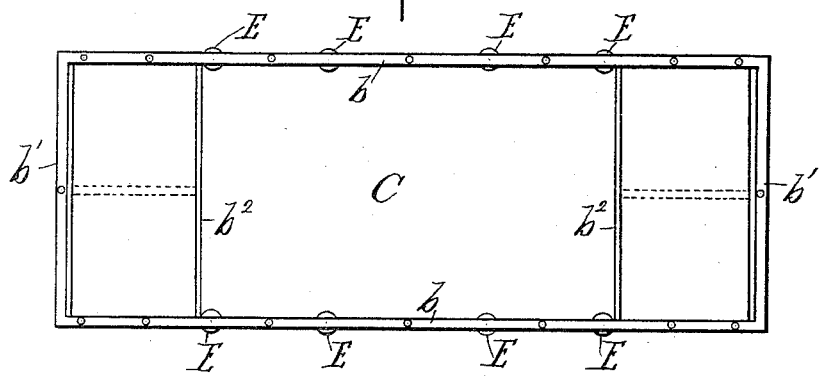

In the drawings, Figure 1 is a side elevation of a car embodying my invention. Fig. 2 is a plan view of the frame.

In carrying out my invention, A represents the car-body, and B the truck. Between the truck and the car is a frame C. This frame may be made up in any desired form—as, for instance, there may be the longitudinal side pieces $b$, held by the cross-bars $b'$, and intermediate pieces $b^2$. On the ends of this framework are attached the boxes or apartments D. In these boxes or apartments are placed the cells of the battery. As will be observed, the tops of the boxes or apartments are on a lower level than the longitudinal side pieces, thus leaving sufficient space for the rods, &c., for operating the brakes and other mechanism to pass.

E represents cushions, preferably of rubber, attached to the frame at points properly corresponding with the saddles F. The manner of attaching this frame is as follows: The frame is first attached to the bottom of the car-body, and the truck then placed underneath with the cushions E resting on the saddles F. Thus the car-body acts to truss and sustain the frame, since were it not there the weight of the batteries on each end would exert such a strain that the frame would bend or give at the middle, and thus allow the ends to drop. It will thus be seen that by thus supporting the batteries it is made possible for the manufacturer to use the same form of electric-motor truck for secondary-battery cars that he would employ for cars with the electric current supplied by exterior conductors. Neither would he be limited to one type of truck, since by the use of the frame it is possible to utilize any of the ordinary electric-motor trucks, and he is therefore not limited in his selection, but can select that truck best adapted for his requirements. So, also, by thus supporting the batteries any ordinary car, of whatever design, whether open or closed, may be mounted on the truck.

In re-equipping railways it is an advantage to be able to utilize as much of the rolling-stock as possible. Thus by my invention car-bodies of any of the standard lengths may be utilized. In all cars convenience requires that that space heretofore utilized for the batteries—such as the space under the seats, &c.—be left free for other purposes, and by the use of my invention this is done.

Another advantage is that the supporting-frame is removable, and can be changed from one body to another. Thus in winter it may be desirable to mount the battery on a closed car, and in summer, when the open cars are run, the frame can be transferred to the open body and there utilized.

The cushions E may be fastened at any required points on the frame, and so be made to correspond with any particular truck which is to be employed. The saddles F, I prefer to provide as a part of my apparatus to take the place of the saddles employed on any truck, for the reason that this saddle is adapted to receive the bearing of my cushions, which, being preferably of rubber, may serve the double purpose of cushions and insulators, and when they are so employed with a saddle bolts $e$ serve to hold the saddles and car-body always in proper relation. The bolts will of course play up and down through the cushions, due to the yielding of the cushions.

I do not, however, limit myself to the employment of the cushions. They may be wholly dispensed with, and in that event the saddles may be of the usual character and be attached rigidly to the car-body, as heretofore, and dependence to relieve the jar of the car be had solely on the usual car-springs. (Not shown.)

What I claim is—

1. The combination, with a railway-car, of an independent frame for supporting secondary batteries, said frame extending substantially the length of the car-body and attached thereto and independent of the truck, substantially as described.

2. The combination, with a railway-car, of an independent frame for supporting secondary batteries, said frame extending substantially the length of the car-body and removably attached thereto, substantially as described.

3. The combination, with a railway-car, of an independent frame for supporting secondary batteries, said frame attached to the car-body and located between the car-body and the truck, substantially as described.

4. The combination, with a railway-car, of an independent frame for supporting secondary batteries, said frame removably attached to the car-body and located between the car-body and the truck, substantially as described.

5. The combination, with a railway-car, of a frame for supporting secondary batteries, said frame attached to the car-body and at each extremity and outside of the car-axle provided with an apartment for the reception of the batteries, substantially as described.

6. The combination, with a railway-car, of a frame for supporting secondary batteries, said frame removably attached to the car-body and at each extremity and outside of the car-axle provided with an apartment for the reception of batteries, substantially as described.

7. The combination, with a railway-car, of a frame for supporting secondary batteries, said frame attached to the body of the car and at each end and outside of the car-axle provided with an apartment for the reception of the batteries, said apartments being of equal size, whereby equal weights of batteries will be carried on each end, substantially as described.

8. The combination, with a railway-car, of a frame for supporting secondary batteries, said frame removably attached to the body of the car and at each end and outside of the car-axle provided with an apartment for the reception of the batteries, said apartments being of equal size, whereby equal weights of batteries will be carried on each end, substantially as described.

9. The combination, with a railway-car, of a frame for supporting secondary batteries, said frame attached to the car-body and provided on each side with a longitudinal side bar having cushions adapted to rest on the saddles, substantially as described.

10. The combination, with a railway-car, of a frame for supporting secondary batteries, said frame removably attached to the car-body and provided on each side with a longitudinal side bar having cushions adapted to rest on the saddles, substantially as described.

11. The combination, with a railway-car, of a frame attached to the car-body for supporting secondary batteries, the top of the battery-apartments being at a lower level than that portion of the frame which is attached to the car, whereby space is left through which to pass the rods for operating the mechanism, substantially as described.

12. The combination, with a railway-car, of a frame removably attached to the car-body for supporting secondary batteries, the top of the battery-apartments being at a lower level than that portion of the frame which is attached to the car, whereby space is left through which to pass the rods for operating the mechanism, substantially as described.

In testimony whereof I sign this specification in the presence of two witnesses.

HARRY H. BLADES.

Witnesses:
C. J. SHIPLEY,
M. A. REEVE.